United States Patent
Pedlar

[11] Patent Number: 6,127,762
[45] Date of Patent: *Oct. 3, 2000

[54] ROTOR

[75] Inventor: Moananui Michael Kenneth Pedlar, Bay of Plenty, New Zealand

[73] Assignee: The Pedlar Family Trust, Mount Maunganui, New Zealand

[*] Notice: This patent issued on a continued prosecution application filed under 37 CFR 1.53(d), and is subject to the twenty year patent term provisions of 35 U.S.C. 154(a)(2).

[21] Appl. No.: 09/142,735

[22] PCT Filed: Feb. 3, 1997

[86] PCT No.: PCT/NZ97/00012

§ 371 Date: Sep. 15, 1998

§ 102(e) Date: Sep. 15, 1998

[87] PCT Pub. No.: WO97/36093

PCT Pub. Date: Oct. 2, 1997

[30] Foreign Application Priority Data

Mar. 15, 1996 [NZ] New Zealand .............. 286185

[51] Int. Cl.[7] .............. H02K 1/22; H02K 15/02; G01C 19/02; G01C 19/06; A63H 1/08
[52] U.S. Cl. .............. 310/261; 310/262; 310/265; 29/598; 74/5 R; 74/5.7; 446/264; 446/256
[58] Field of Search .............. 310/261, 262, 310/264, 265, 266, 269, 156; 29/598; 74/5 R, 5.7, 572, 5.22; 446/264, 256, 233

[56] References Cited

U.S. PATENT DOCUMENTS

| | | | |
|---|---|---|---|
| 825,252 | 7/1906 | Vogel | 310/264 |
| 829,801 | 8/1906 | Pratt et al. | 310/264 |
| 994,058 | 5/1911 | Coates | 310/264 |
| 2,332,507 | 10/1943 | Dailey | 273/147 |
| 2,700,246 | 1/1955 | Ostberg | 46/64 |
| 3,595,169 | 7/1971 | Ziemba | 102/235 |
| 3,608,494 | 9/1971 | Ziemba | 102/235 |
| 3,672,235 | 6/1972 | Ringwall | 74/5.6 |
| 4,257,648 | 3/1981 | Bodine | 299/37 |
| 4,280,366 | 7/1981 | Aberg | 74/5.7 |
| 4,661,737 | 4/1987 | Barri | 310/166 |
| 4,691,132 | 9/1987 | Bertram et al. | 310/156 |
| 4,874,300 | 10/1989 | Laing et al. | 417/420 |
| 5,249,869 | 10/1993 | Mabe | 384/278 |

FOREIGN PATENT DOCUMENTS

| | | |
|---|---|---|
| 63261 | 10/1891 | Germany . |
| 613285 | 10/1933 | Germany . |
| 613285 | 5/1935 | Germany . |
| 63261 | 7/1992 | Germany . |
| 540093 | 2/1942 | United Kingdom . |
| PCT/AU87/00418 | 8/1988 | WIPO . |

OTHER PUBLICATIONS

International Search Report for International Application No. PCT/NZ97/00012.

International Preliminary Examination Report for International Application No. PCT/NZ97/00012.

*Primary Examiner*—Nick Ponomarenko
*Assistant Examiner*—Dang Dinh Le
*Attorney, Agent, or Firm*—Wolf, Greenfield & Sacks, P.C.

[57] ABSTRACT

A rotor (1) is of a substantially spherical shape with one complete half of the sphere (2) still remaining. The rotor (1) effective takes the shape of the head of a "mushroom." The other half of the sphere has had its material removed or omitted forming the stem (3). The depth of the cut "D" and the length "L," the radius of the sphere, will determine the ratio of the respective weights of the complete half sphere (2) and the stem portion (3). Suitably the weight of the one half to the other half of the spherical body is between about 0.75 and 0.85 and more preferably 0.8. When an external force is applied to the rotor (1), it rotates simultaneously about a pair of orthogonal axes one of which is defined by the edge (6) of the spherical body between the two halves.

13 Claims, 5 Drawing Sheets

ROTOR

This application is a National Stage application under 35 U.S.C. §371 of PCT/NZ97/00012, filed Feb. 3, 1997.

BACKGROUND OF THE INVENTION

The present invention relates to improvements in and relating to rotors.

The term "rotor" is used in the present specification as a very broad term covering any rotating body the rotation of which is able to perform useful work. Such work may include functions analogous to those performed by known gyroscopes and rotational energy storage devices, as well as, it is believed, displacement and control functions in orientatable bodies.

The innumerable uses of the present invention will become apparent to those skilled in the engineering, aeronautical and other fields but it is to be understood that the present invention has application wherever the rotation of a body to perform useful work is involved. Immediately apparent uses of the present invention will therefore include the rotating core of an electrical generator or turbine, a gyroscopic body the rotation of which may be utilised as a stabiliser within a land, sea, air or space vehicle or as a means of effecting a displacement of a land, air, space or sea vehicle, a rotating crushing member of a pulverisers, or even as a toy.

Whenever the term "rotor" is used in the present specification it is therefore to be understood that it is intended to cover all possible uses.

To the present time various types of rotors which are well known including those for the aforementioned uses but all of which suffer from one or more disadvantages relating to efficiency, cost and/or stability for example.

In PCT/AU97/00417 for example there is a proposal for gyroscopic rotors to be utilised in order to generate thrust. In various types of vibration generating apparatus, see for example U.S. Pat. No. 4,257,648 and United Kingdom patent 540,093, vibrations can either be created or damped using a rotor. In any typical electrical generator or motor, a rotor comprising an armature will rotate within a stator.

In all such cases considerable inefficiencies will be experienced as the rotor is brought up to speed, or where its speed is changed, particularly in respect of the losses due to work done in overcoming friction.

It is desirable that where energy is imparted to a rotor in the form of rotational angular momentum, the rotor retains that energy for as long as possible. Thus the conversion of the rotational energy into useful work performed by the rotor may be as efficient as possible. To this end, energy losses such as those caused by frictional effects and the like must be avoided or at least minimised. Similarly optimum rotor geometries may be selected so as to provide the best energy retention properties as practicable in the particular situation in which the rotor is to be used.

OBJECTS OF THE INVENTION

It is thus an object of a preferred embodiment of the present invention to provide a rotor which in operation has operational losses which are substantially reduced or at least kept to a minimum.

According to an object of one preferred embodiment of the present invention a rotor is to be able to accommodate external forces imposed thereon and by adaptation of its rotation is able to wholly or partially compensate for those external forces.

It is a further object of a preferred embodiment of the invention to provide a rotor which is capable of storing angular momentum whereupon the rotational energy provided thereby is able to effect, at least wholly, or partially, orientation and displacement functions in respect of said rotor, or at least to provide the public with useful choice.

Further objects of the present invention in all its various embodiments will become apparent from the following description.

SUMMARY OF THE INVENTION

According to one aspect of the present invention there is provided a rotor comprising a spherical body wherein a portion of one half of the spherical body has been omitted or removed, the weight of said portion being such that the weight ratio of said one half to the other half of the spherical body is such that the rotor is adapted to rotate about a pair of orthogonal axes one of which is defined by the edge of the spherical body between the said one and other halves.

In an alternative aspect the present invention provides a rotor comprising a spherical body wherein a portion of one half of the spherical body has been omitted or removed, the weight of said portion being such that the ratio of weight of said half to the other half is such that the rotor is adapted to rotate about first and second mutually orthogonal axes, said first axis being parallel to an angular momentum vector defined by the rotation of the spherical body and said second axis being parallel to the axis of rotational symmetry of said spherical body.

According to a further aspect of the present invention there is provided a rotor as defined in either of the two paragraphs immediately above which is of a substantially "mushroom" shape.

According to a further aspect of the present invention there is provided a rotor as defined in any one of the three immediately preceding paragraphs wherein said portion of said one half of said spherical body which is removed or omitted comprises approximately one third of the total weight of the spherical body if the portion were not removed or omitted.

According to a further aspect of the present invention, there is provided a rotor as defined in any one of the four immediately preceding paragraphs wherein said edge defines a plane intersecting the centre of the spherical body.

In one embodiment the ratio of the weight of said one half to the other half of the spherical body is between 0.75 and 0.85, more preferably 0.8.

In one embodiment the portion removed or omitted is defined by a right-angled cut at the equator of the spherical body so that a stem is formed with sides substantially perpendicular to the plane defined by the edge.

In one embodiment the rotor incorporates a spherical core comprising heavier material than that which comprises the spherical body, such as mercury, tritium, yttrium, plutonium and other heavy elements as may yet be discovered.

In one embodiment, a spherical core may comprise mixtures of one or more of the stable or unstable isotopes of the above-mentioned elements of the immediately preceding paragraph.

In one embodiment the rotor may incorporate a ceramic coating over its surface.

In one embodiment the rotor may wholly or partially include a magnetic or magnetisable material.

In one embodiment the magnetic or magnetisable material of the immediately preceding paragraph comprises neodynium or isotope thereof, salt, oxide or alloy thereof.

According to a still further aspect of the present invention there is provided a work producing unit including a stator and a rotor as defined above in any one of the preceding paragraphs rotatably positioned therein.

According to a still further aspect of the present invention a work producing unit as defined in the immediately preceding paragraph has said rotor rotatably mounted within said stator by means of hydraulic, pneumatic, electrical and/or magnetic forces.

According to yet a still further aspect of the present invention a work producing unit as defined in the immediately preceding paragraph has said stator with a plurality of hydraulic or pneumatic jets positioned therearound which acting on said rotor in use cause it to rotate.

A further aspect of the present invention provides a work producing unit as defined in any one of the three immediately preceding paragraphs wherein said rotor in use can react gyroscopically to external forces detected by said stator so as to alter its attitude of rotation and thereby tend to counteract or stabilise the effects of said external forces.

According to a still further aspect of the present invention, there is provided a rotor and/or work producing unit incorporating a rotor, adapted to provide orientatable and/or displacement forces to an object with which the rotor or one or more of said rotors is/are associated.

According to a still further aspect of the present invention there is provided a rotor and/or work producing unit incorporating a rotor, substantially as herein described and/or with reference to the accompanying drawings.

Further aspects of this invention which should be considered in all its novel aspects will become apparent from the following description given by way of example of possible embodiments thereof and in which reference is made to the accompanying drawings

DESCRIPTION OF PREFERRED EMBODIMENTS

Rotors, for whatever purpose, can be expected to have at least one axis of symmetry. Such rotors are typically cylindrical and rotatable about a single, typically longitudinal, axis. While a motive force is acting on the rotor it will continue to rotate about that single axis with an efficiency largely dependent on the nature of the motive force and its interaction with the rotor, and on the frictional forces acting on the rotor. With the removal of the motive force the rotor will tend to rapidly return to a stationary position. Bearings, bushes or the like will typically be provided so as to constrain the rotor so as to rotate about the single axis so that the rotation is unaffected by any external forces acting on the stator.

The present invention in complete contrast provides a rotor which is able to rotate about a pair of orthogonal axes and which is able to translate the influence of external forces into an appropriate change of the attitude of those axes.

Without being bound by any particular theory, it is believed that, among other aspects, the angular momentum vectors associated with the mutually orthogonally rotations, couple to provide the rotor properties described herein. In this way the rotor of the present invention may be able to be utilised as a stabiliser within a moving body or as a moving body per se.

The applicant has found surprisingly that if a defined portion of one half of a spherical body is omitted or removed, once the spherical body is then rotated it will rotate about a pair of orthogonal axes one of which is parallel to a plane defined by an edge running around the equator of a spherical body. The other axis is parallel to the rotationally symmetric axis of the body. A coupled rotational movement is observed whereby an "end over end" rotation is accompanied by rotation about the rotor's axis of rotational symmetry.

Depending on the material used for the spherical body, and in particular its relative density or specific gravity (all of which are affected by the particular element(s) used along with their particular isotopes), the amount of the spherical body removed or omitted is suitably of the order of between one tenth and one third of the total weight of the original spherical body. The removal or omission is performed about an equatorial plane between the two halves of the spherical body so as to leave a substantially straight or flat edge therebetween. The removal may be effected by making a right angled cut at the equator thereby producing a "stem and head" arrangement as shown in the accompanying drawings. The depth of the cut and length of the stem produced are mathematically related as is the volume (and thus for uniform density—the mass) of the remaining portion.

Figure 2:
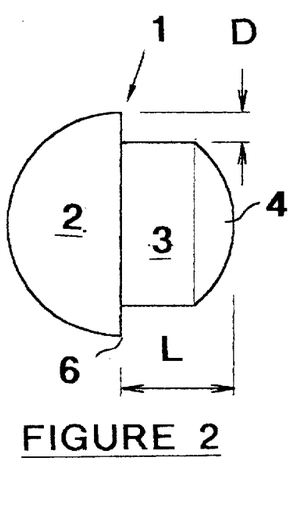

If the cut depth is D (as shown in FIG. 2) the volume of the stem portion 3 and 4 may be expressed as:

$$V = V(3) + V(4);$$

where $$V(4) = PI*[(\tfrac{2}{3})*R\string^3 - R\string^2*(K)\string^(\tfrac{1}{2}) + (\tfrac{1}{3})(K)\string^(\tfrac{3}{2})]$$

and $$V(3) = PI(*(R-D)\string^2*(K)\string^(\tfrac{1}{2})$$

where $$K = (2*R*D - D\string^2)$$

where R is the radius of the sphere 2.

The equations are given in a form as would be understood by a computer programmer and their interpretation and application will be clear to one skilled in the art. The volume of the head 4 will simply be half of the volume of a sphere of radius R.

By these equations a particular embodiment of the invention has been produced with a ratio of stem weight to head weight at approximately 0.80±0.15. This corresponds to a D/R ratio of approximately 0.20. Other geometries have been found to have useful application and a range of approximately ±10% in D is envisaged.

It has been found that whether the rotor is a dense material such as lead, a less dense material such as stainless steel, or a relatively light material such as plastics or aluminium, removal or omission of approximately one third, or other proportion discussed above, of the spherical body in this manner will result in a rotor which when spun around its lengthwise axis will achieve a stable rotation about a pair of mutually orthogonal axes. Moreover, the efficiency with which the rotor is able to achieve a stale rotation about the two axes is such that a motive force is able to be speedily and efficiently translated into a high speed but stable rotation. Also, the efficiency of the rotor is such that its rotation can be maintained at the required speed with a very high efficiency. Furthermore, the fact that the rotor is not constrained, in a preferred embodiment, by a shaft or the like, so as to rotate about a single axis, the rotor can be utilised for the purposes, for example, of the stabilisation of a moving body in which it is located such as an aircraft, spacecraft, ship or car. It is envisaged that a rotor of the present invention of sufficient size could form the whole or part of a land, air, space or sea vehicle which would then have inherent stability due to it being able to accommodate and suppress the effects of external forces acting on it such as turbulence in the case of aircraft.

In addition is believed that the particular properties of the rotor described herein include an ability to stabilise and displace objects when the rotor is spun at high angular velocities. Such an embodiment may include a multiplicity of rotors coupled in a fixed relation to the object to the stabilised or displaced. Alternatively, the rotors could be located in a number of configurations on a rotating or stationary disc wherein angular stabilisation and/or displacement may be imparted thereto. Without being bound by any particular theory, it is believed that the forces which may be produced by said rapidly spinning rotor(s) couple so as to effect said stabilisation/displacement.

Numerous configurations will be apparent including placing a rotor or rotors at lattice positions corresponding to the basic atomic packing configurations and exhibiting the known range of symmetry properties.

Figure 1:
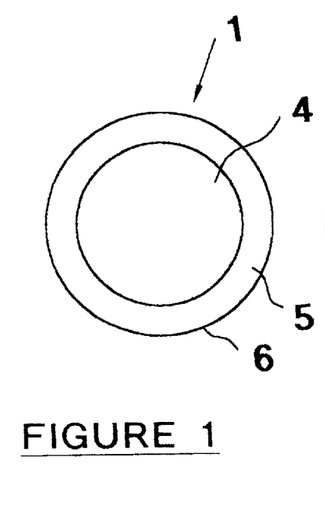
FIGS. 1, 2 & 3: Show diagrammatically front, side and plan perspective views respectively of a rotor according to one possible embodiment of the invention.
Figure 3:
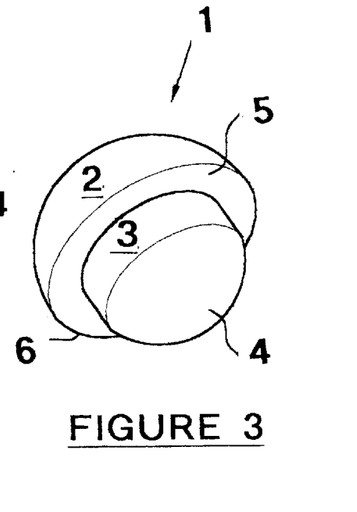

Referring to the accompanying drawings, a rotor according to one possible embodiment of the invention is referenced generally as arrow 1. It is seen as being of a substantially spherical shape with one complete half of the sphere 2, still remaining. This effectively takes the shape of the head of a "mushroom". The other half of the sphere has had a portion of its material removed or omitted to a depth "D" along an equatorial cut-line or edge 6 to leave a face 5 leading into a stem portion 3 extending out to the remaining portion of the sphere 4. As discussed above, the depth of the cut "D" and the length "L", the latter also being the radius of the sphere where the head 2 is the complete half sphere, will determine the ratio of the respective weights of the complete half sphere 2 and the stem portion 3,4. Depending on the relative density of the material of the rotor 1 the amount of material removed for omitted in the case of a preformed body such as a moulded plastics or aluminium) may be of the order of 10% to $33^{1/3}$% of the total weight of the sphere although it is believed that this proportion may vary perhaps by 5% by weight on either side so that the amount of material removed or omitted will then be in the range of approximately 5% to 38% of the total weight of the original sphere.

Figure 4:
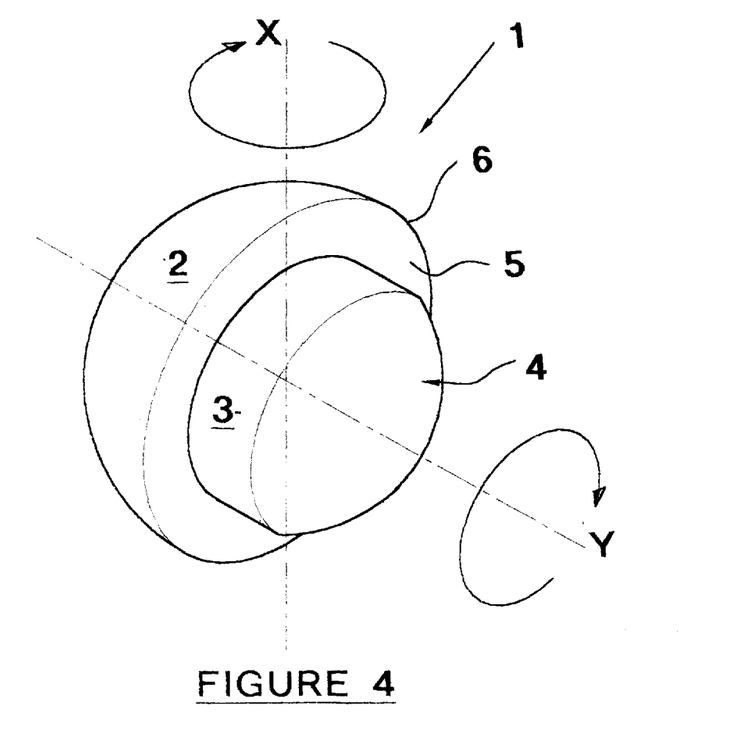
FIG. 4: Shows diagrammatically a plan perspective view of the rotor with its axes of rotation identified.
Figure 5:
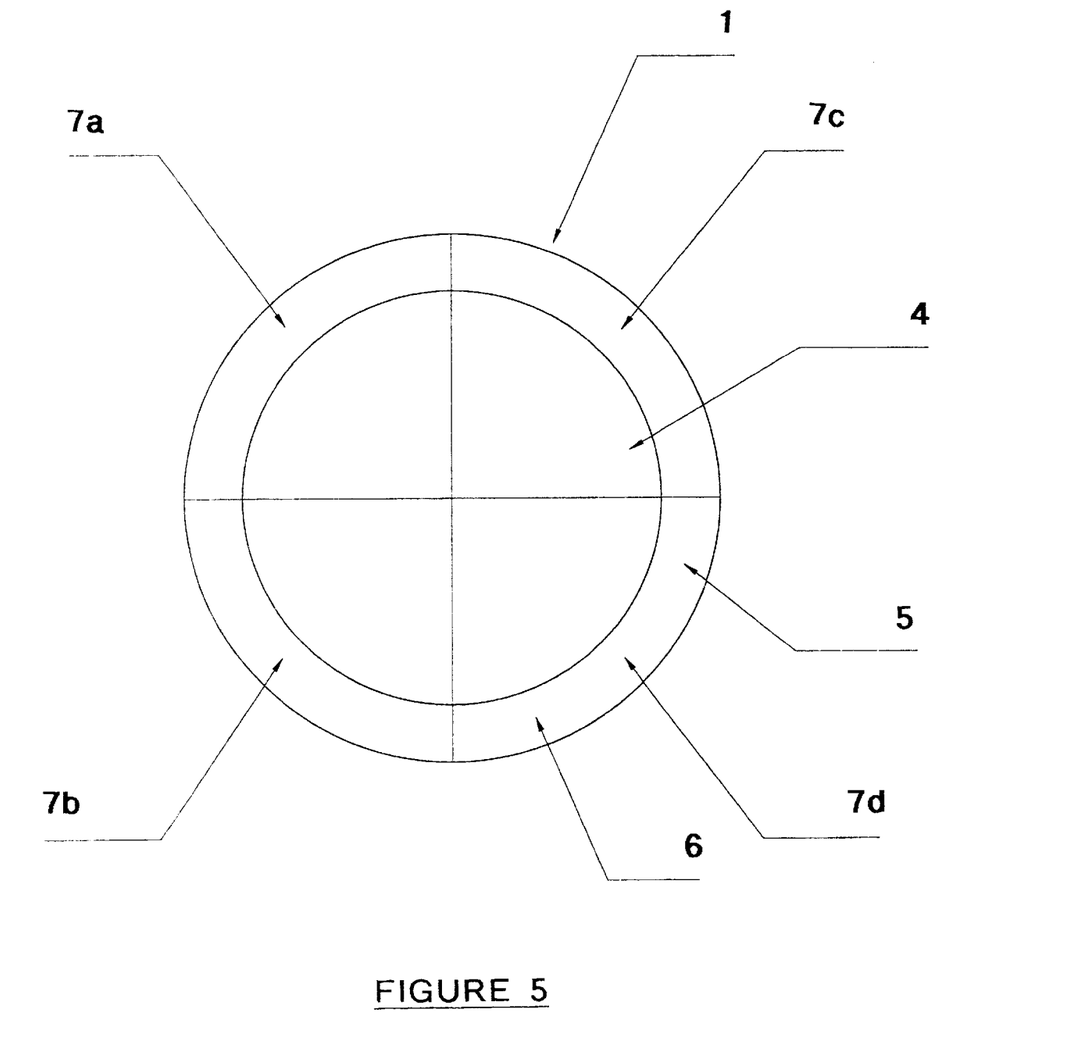
FIGS. 5–8: Shows diagrammatically the manner of operation of the rotor and its possible use as a toy.
Figure 6:
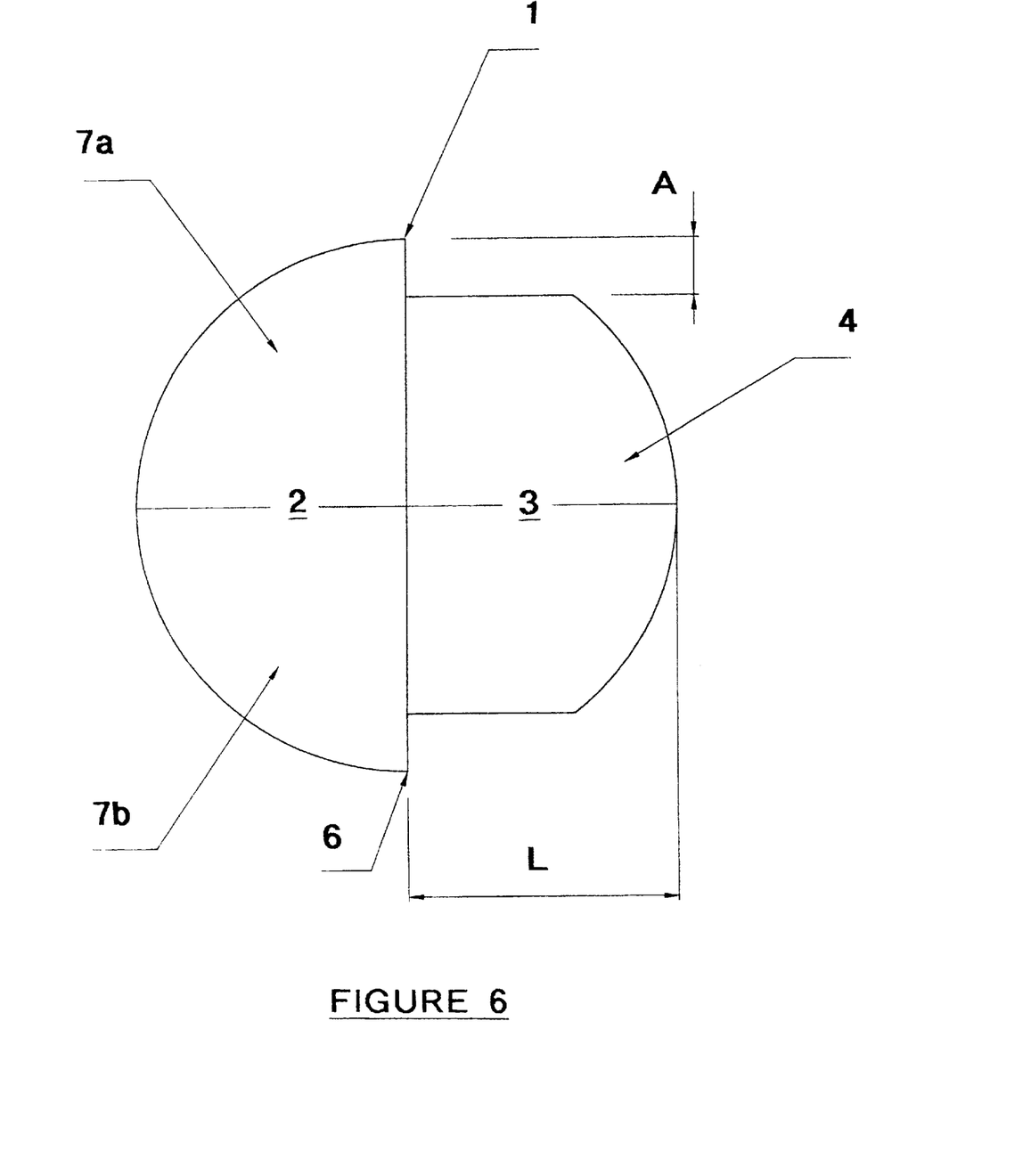
Figure 7:
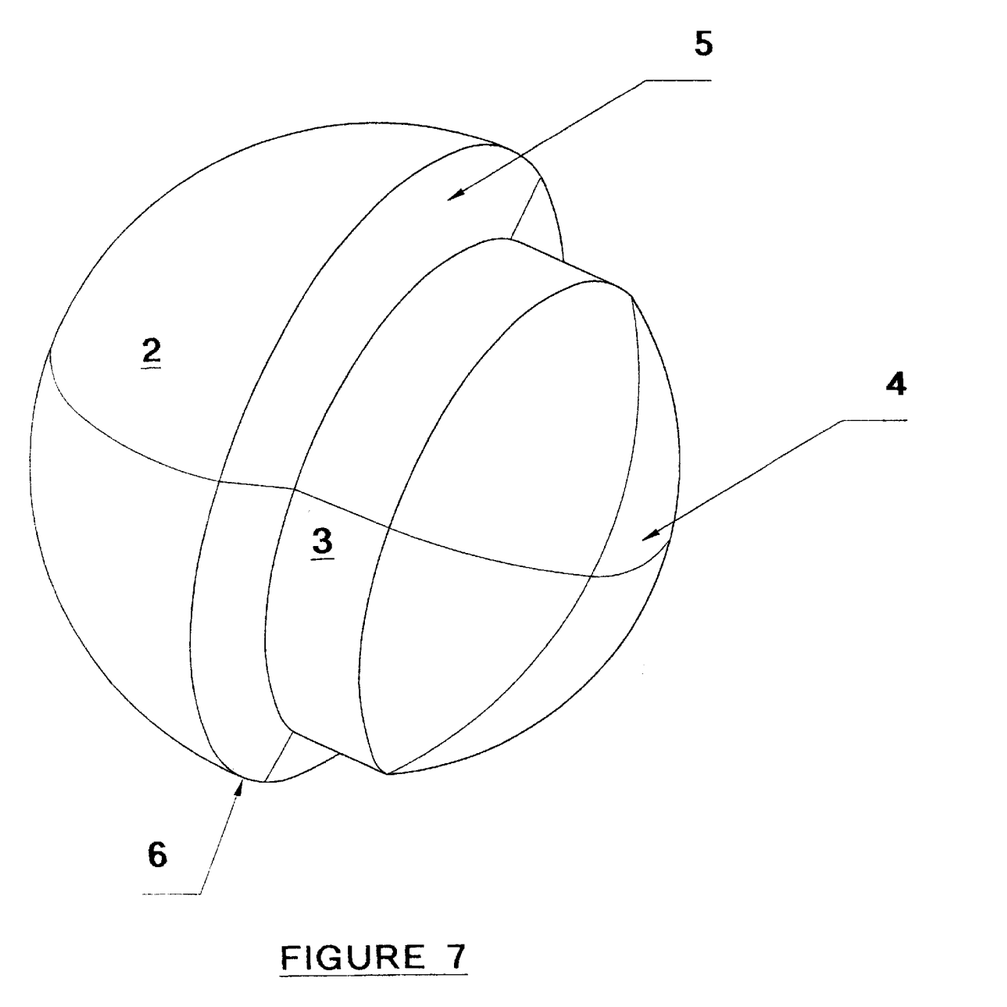
Figure 8:
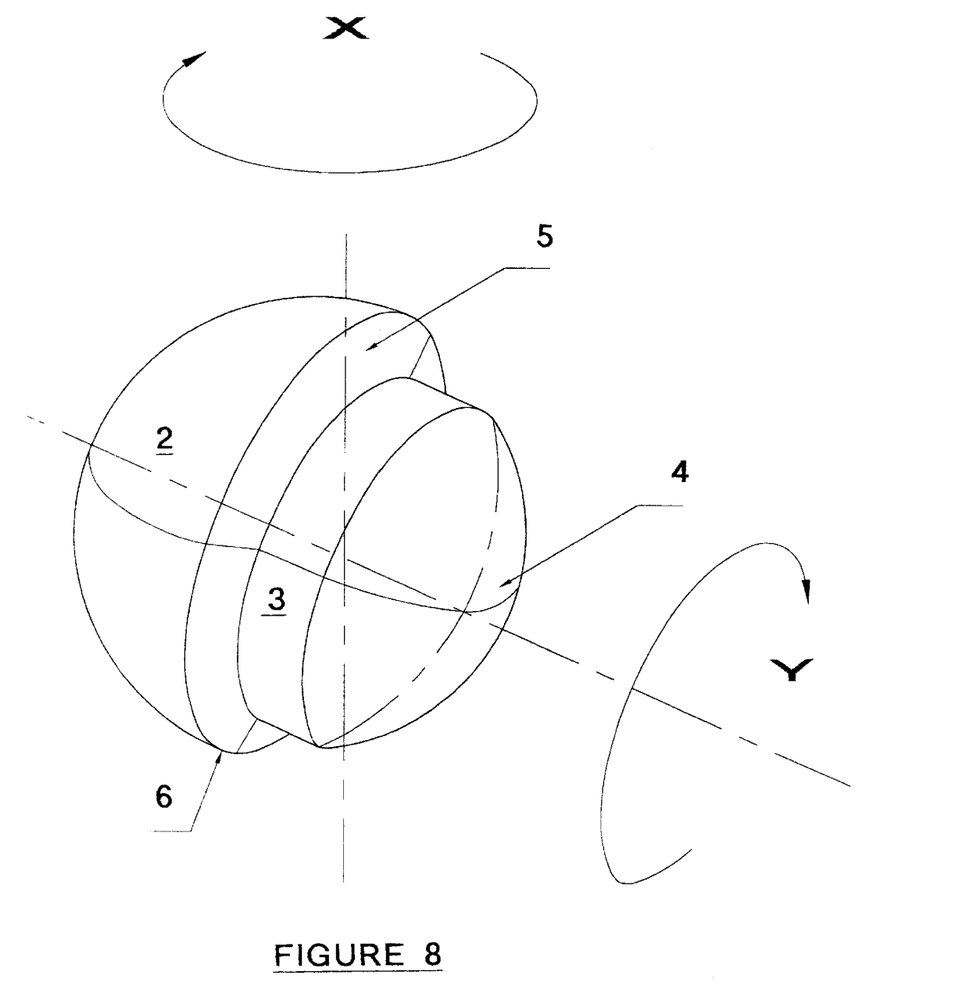

It is seen that the resultant rotor 1 is of a substantially "mushroom" shape. When the rotor 1 is rotated or spun it has surprisingly been found that it will simultaneously rotate about a pair of axes indicated by arrows "X" and "Y". The rotation about the latter axis will substantially correspond with the edge 6. The twin axes rotation is believed by the applicant to enable the rotor 1 to very rapidly achieve a high speed rotation and due to minimal frictional losses at bearing or bush surfaces a high degree of efficiency can be attained.

In one embodiment of the present invention the rotor 1 may be positioned within a stator and acted on by tangentially directed hydraulic or pneumatic jets which will create and maintain the rotation of the rotor 1. In one embodiment the rotor 1 may be associated or provided with magnetic fields so as to be able to translate the rotation of the rotor 1 into electrical or mechanical energy. In that embodiment the rotor 1 may be of a magnetic or magnetisable material. Neodynium in a suitable form, such as a salt, oxide, alloy or an isotope thereof may be used for this purpose. On being magnetised it has been found that a pair of orthogonal North and South poles pairs can be obtained. It is envisaged that superconducting windings may be incorporated in this embodiment so as to enable the production or storage of electrical energy with minimal losses. In a further embodiment of the invention the rotor 1 may it is envisaged be provided with vanes or impellers for example so that the rotation of the rotor 1 provides for a pumping action of fluid or material through the stator.

In one embodiment of the invention the rotor 1 may originally comprise a solid body of material from which the material to form the stem 3 is removed or omitted. In alternative embodiments the rotor 1 may be formed or provided as a wholly or partially hollow body depending on the stem/head mass ratio desired.

The efficiency of the present rotor in respect of its ability to take up and retain rotational energy has been shown by measurements of the decay time of a stable spinning rotor once the motive force has been removed. A steel rotor of approximately 0.95 kilograms was energised by means of four compressed air jets oriented so as to impinge as closely as possible at a perpendicular direction to the plane defined by the equatorial edge. Constant air pressure was applied until the rotor had stabilised at speed. It is to noted that the rotor was supported by a polished glass plate in order to minimise frictional losses and allow the maintenance of reproducible external conditions on each of the test rotors. Once the rotor had stabilised at speed, the imparting force was removed following which the time taken for the rotational energy of the rotor to decay to zero was measured. In the case of a steel rotor the decay time was approximately four minutes and twenty five seconds, for brass five minutes and twenty seconds seconds, aluminum: two minutes and fifty five seconds and acetal (plastic) rotor; approximately two minutes. While in some applications lighter weight rotors will be appropriate, it is envisaged that for energy take up and efficiency and retention, high density rotors will be implemented.

In an alternative embodiment, the equatorial cut may be formed as an annular channel encircling the "stem" section of the rotor. This is in contrast to the flat underside surface on the rotors as discussed above. It is believed that such a channel configuration may increase the efficiency of the rotor when the rotational energy is imparted by means of compressed air, hydraulic means or the like.

Variable density distribution may be provided within the rotor by means of incorporating a core composed of dense materials.

This core may be symmetrically placed within the rotor and be located at the centre of gravity or centre of symmetry of rotation of the rotor. It is envisaged that elements, for example mercury or yttrium may be inserted to the core. Without being bound by any particular theory, it is believed that nuclear couplings produced by various combinations of isotopes of the above-mentioned elements interact in a macroscopic way to provide hereinbefore unknown properties in a rotating body such as the rotor described above.

Such properties, it is believed, may be exploited to enhance the above-mentioned applications of the rotor.

Returning to the uniform density rotor, the provision of such extreme density distributions within a rapidly spinning rotor, it is believed, can provide improved stabilisation in the body in which the rotor is embedded or contained. A particular example may include vibratory absorption characteristics in equipment such as drills, and the like. Further applications may include stabilising the course or path of an airborne or spaceborne object wherein angular and linear displacements may be effected without reference to an eternal motive force. It is believed that the particular couplings of the rotational attributes exhibited by a rotor may be exploited and/or coupled with those angular moments exhibited by similarly coupled rotors in order to achieve this end.

Clearly it is desirable to reduce frictional losses as much as practicable in the particular application envisaged. To this end it is envisaged that the rotor may be suspended within a magnetic field and angular energy imparted thereto by means of known electromagnetic techniques. The provision of such magnetic or electromagnetic fields required in order to spin or reorientate the body such as that described above being known and within the scope of one skilled in the art.

It is further believed that applications of superconductor technology may be exploited in order to allow the rotor to be suspended within dense magnetic fields in order to reduce frictional losses. Thus it may be seen that the rotor may find applications in such areas as diverse as water pump units wherein a rotor is encapsulated in a substantially spherical containment vessel whereupon a fluid is supplied at one end following which the rotation of the rotor effects its passage through the spherical containment vessel and through the exit passage at the other end. It is believed that the rotor may exhibit a particularly efficient means of carrying out this objective.

While the present example has been described in the context of a rotor having a stem of a substantially cylindrical shape, it is envisaged that other shapes may be implemented such as tapering right conical structures and asymmetrical configurations where necessary.

In terms of the stabilisation properties in conjunction with the advantageous energy retention characteristics, it is believed that the present rotor represents an optionally configured geometry. Traditionally gyroscopic or other angular momentum orientatable devices have been designed so as to distribute the mass or masses, which are to be symmetrically rotated, at displacements intended to provide the optimal or maximised angular momentum for a given rotational velocity. It is believed that in the case of the present rotor, a truncated or portioned spherical rotor represents an optimal mass configuration for the uptake of energy and establishment of coupled angular momentum. The magnitude of the angular momentum vector produced by a rotating body is dependent upon the rate of rotation and the rotating mass of the body. The larger the magnitude, the more resistant the body to reorienting forces. In the present case, it is believed that a stabilisation vector produced by spinning a rotor such as that described above at extremely high rotational velocities, results in a highly stable rotating body having known precession and angular properties which may be exploited advantageously. It is speculated that this is the result of exploiting an originally spherical body as a rotor. A sphere represents the most volumetrically efficient way of packing matter. Therefore, the rotational energy is likely to be maximised by the use of such a rotor geometry.

It is believed that a number of physical properties exhibited by the rotor require rotational velocities and environmental conditions which are not readily met by present technology and it is envisaged that some of the applications of the rotor and attendant properties exhibited by same will be operable only when such technology has become available. Such technology includes future developments in superconducting technology, magnetohydrodynamics and their application in the orientation and displacement of bodies, as well as the interactions between macroscopic objects and matter at an atomic nuclear scale.

Referring now to FIGS. 5–8 of the accompanying drawings, equivalent references have been used where appropriate as in the earlier drawings. In this embodiment the rotor 1 is provided with four differently coloured or patterned quadrants 7a, b, c, d. For example the quadrants may be coloured red, blue, green, and yellow. When the rotor 1 rotates, due to the rotation about the orthogonal axes, x, y, one of these colours will appear to dominate the entire rotor 1 as it rotates. Thus the separate colours will appear sequentially as being as the colour of the rotor 1. This makes this embodiment useful as a toy or game but of course this phenomena could also have many more serious applications which will be readily appreciated by those skilled in the engineering arts. It is believed that the coupled rotation about the two abovementioned axes causes the observed colour transitions.

Wherein the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope of the invention as set out in the appended claims.

What is claimed is:

1. A rotor comprising a spherical body wherein a portion of one half of the spherical body has been omitted or removed, a weight of said portion being such that a weight ratio of said one half to the other half of the spherical body is such that the rotor is adapted to continuously simultaneously rotate through 360° about a pair of orthogonal axes one of which is defined by an edge of the spherical body between said one and other half, and the other axis is substantially orthogonal to the plane defined by said edge of the spherical body; wherein said portion of said one half of said spherical body which is removed or omitted comprises approximately one tenth to one third of a total weight of the spherical body if said portion was not removed or omitted.

2. The rotor as claimed in claim 1, wherein a first orthogonal axis is parallel to an angular momentum vector defined by a rotation of the spherical body and a second orthogonal axis is parallel to an axis of rotational symmetry of said spherical body.

3. The rotor as claimed in claim 1 wherein said rotor is of a substantially "mushroom" shape.

4. The rotor as claimed in claim 1 wherein said edge defines a plane intersecting the centre of the spherical body.

5. The rotor as claimed in claim 1 wherein said weight ratio is between about 0.75 to and 0.85.

6. A rotor as claimed in claim 5 wherein the ratio is approximately 0.8.

7. The rotor as claimed in claim 1 wherein the portion removed or omitted is defined by a right-angled cut at the equator of the spherical body so that a stem is formed with sides substantially perpendicular to the plane defined by the edge.

8. The rotor as claimed in claim 1 wherein said rotor incorporates a spherical core comprising a first material and said spherical body comprises a second material, said first material having a higher relative density than said second material.

9. The rotor as claimed in claim 8 wherein said first material is selected from a group consisting of mercury, tritium, yttrium, plutonium and mixtures of one or more of stable or unstable isotopes thereof.

10. The rotor as claimed in claim 1 further including a ceramic coating over its external surface.

11. The rotor as claimed in claim 1 which wholly or partially includes a magnetic or magnetisable material.

12. The rotor as claimed in claim 11 wherein said magnetic or magnetisable material comprises a material selected from a group consisting of neodynium or a neodynium isotope, a neodynium salt, a neodynium oxide and a neodynium alloy.

13. A work producing unit including a stator and a rotor, said rotor comprising a spherical body wherein a portion of one half of the spherical body has been omitted or removed, a weight of said portion being such that a weight ratio of said one half to the other half of the spherical body is such that the rotor is adapted to continuously simultaneously through 360° rotate about a pair of orthogonal axes one of which is defined by an edge of the spherical body between said one and the other half, and the other axis is substantially orthogonal to the plane defined by said edge of the spherical body; wherein said portion of said one half of said spherical body which is removed or omitted comprises approximately one tenth to one third of the total weight of the spherical body if said portion was not removed or omitted, said rotor being rotatably positioned within said stator.

* * * * *